(12) United States Patent
Hillery

(10) Patent No.: US 7,349,470 B2
(45) Date of Patent: Mar. 25, 2008

(54) DECISION FEEDBACK EQUALIZERS WITH CONSTRAINED FEEDBACK TAPS FOR REDUCED ERROR PROPAGATION

(75) Inventor: William J. Hillery, Lafayette, IN (US)

(73) Assignee: Zenith Electronics Corporation, Lincolnshire, IL (US)

( * ) Notice: Subject to any disclaimer, the term of this patent is extended or adjusted under 35 U.S.C. 154(b) by 609 days.

(21) Appl. No.: 10/860,290

(22) Filed: Jun. 3, 2004

(65) Prior Publication Data

US 2005/0025230 A1    Feb. 3, 2005

Related U.S. Application Data

(60) Provisional application No. 60/475,765, filed on Jun. 4, 2003.

(51) Int. Cl.
*H03K 5/159* (2006.01)
(52) U.S. Cl. .................................................. 375/233
(58) Field of Classification Search ................ 375/229, 375/230, 232, 233; 333/18, 282; 708/300, 708/322, 323; 379/340, 398
See application file for complete search history.

(56) References Cited

U.S. PATENT DOCUMENTS

2003/0099289 A1 * 5/2003 Birru ........................... 375/233

OTHER PUBLICATIONS

Basker et al. Systems with Uncertain Input Delay—Design for Robust Stability and Performance, Proceedings of the American Control Conference, Jun. 1999, p. 414-418.*
R. L. Kosut et al., "On Achieving Reduced Error Propagation Sensitivity in DFE Design via Convex Optimization", Proceedings of the 39th IEEE Conference on Decision and Control Sydney, Australia, Dec. 2000, pp. 4320-4323.
M. Reuter et al., "Mitigating Error Propagation Effects in a Decision Feedback Equalizer", IEEE Transactions on Communications, vol. 29, No. 11, Nov. 2001, pp. 2028-2041.
M. Dowell et al., "A Modified Regula Falsi Method for Computing the Root of an Equation", BIT, vol. 11, 1971, pp. 168-174.

* cited by examiner

*Primary Examiner*—Sam K. Ahn (57) ABSTRACT

Constrained feedback tap weights of a decision feedback equalizer are determined by iteratively solving a non-linear equation for a constraint multiplier. The non-linear equation is based on a 2-norm of feedback tap weights constrained by an explicit constraint constant.

22 Claims, 2 Drawing Sheets

DECISION FEEDBACK EQUALIZERS WITH CONSTRAINED FEEDBACK TAPS FOR REDUCED ERROR PROPAGATION

RELATED APPLICATIONS

This application claims the benefit of U.S. Provisional Application 60/475,765 filed in Jun. 4, 2003.

TECHNICAL FIELD OF THE INVENTION

The present invention relates to decision feedback equalizers having constrained taps.

BACKGROUND OF THE INVENTION

The presence of multipath interference in a broadcast channel, such as a broadcast television channel, has been a persistent obstacle to good reception by a receiver. The broadcast television channel is a relatively severe multipath environment due to a variety of conditions that are encountered in the channel and at the receiver. Channels are characterized by channel impulse responses which may be several hundreds of symbols long, so that strong interfering signals may arrive at the receiver both before and after the largest amplitude signal. In addition, the signal transmitted through the channel is subject to time varying channel conditions due to the movement of the transmitter and/or due to signal reflectors, airplane flutter, and, for indoor reception, people walking around the room. If mobile reception is desired, movement of the receiver must also be considered.

Multipath adversely affects the ability of the receiver to correctly receive the symbols transmitted by the transmitter. Therefore, equalizers, such as decision feedback equalizers, are used in receivers in order to cancel the effects of multipath and thereby improve signal reception.

The decision feedback equalizer (DFE) is an attractive type of equalizer for this application because it theoretically performs better than a linear equalizer. The decision feedback equalizer typically includes a feed forward filter that includes a plurality of feed forward taps, a feedback filter that includes a plurality of feedback taps, some type of decision device such as a slicer or trellis decoder, a summer, and a tap weight calculator that sets the tap weights for the feed forward filter and the feedback filter.

The received signal is provided to the feed forward filter. The outputs of the feed forward filter and the feedback filter are summed by the summer. The output of the summer forms the output of the decision feedback equalizer. The decision device decides a correct value for the output of the summer and feeds this decision to the feedback filter. The tap weight calculator estimates the channel impulse response based on the received signal and the decisions from the decision device. The tap weight calculator then determines the optimal (MMSE—minimum mean squared error) tap weights based on this channel impulse response estimate and the estimated signal-to-noise ratio that characterizes the received signal, and adjusts the feed forward taps of the feed forward filter and the feedback taps of the feedback filter according to these tap weights.

The performance of decision feedback equalizers can be affected by a phenomenon known as error propagation. Error propagation occurs when a decision error, fed into the feedback filter, causes an additional decision error to occur. In cases of severe intersymbol interference (ISI), the reduction in performance can be so large that steps must be taken to mitigate error propagation. The probability that a decision error will propagate a new decision error is a function of the size of the tap weights of the feedback filter. Larger tap weights increase the probability that a new error will occur as a result of a previous error.

One of the known ways to reduce error propagation is to calculate the MMSE tap weights for the decision feedback equalizer subject to a constraint on the tap weights of the feedback filter, thereby limiting the tap weights of the taps of the feedback filter to values that reduce error propagation. However, the design of a practical decision feedback equalizer that constrains its tap weights to values that reduce error propagation is not intuitive.

The present invention relates to practical designs for decision feedback equalizers that constrain their tap weights to values that reduce error propagation.

SUMMARY OF THE INVENTION

According to one aspect of the present invention, a method of supplying tap weights $g_F$ and $g_B$ to feed forward and feedback taps of a decision feedback equalizer comprises the following: generating a non-linear equation with a constraint multiplier as a root of the non-linear equation; solving the non-linear equation for the constraint multiplier using an iterative process; calculating the tap weights $g_F$ and $g_B$ as a function of the constraint multiplier, wherein the tap weights $g_B$ are constrained by a constraint; and, supplying the tap weights $g_F$ and $g_B$ to the decision feedback equalizer.

According to another aspect of the present invention, a method of supplying feed forward tap weights $g_F$ and feedback tap weights $g_B$ to respective feed forward and feedback taps of a decision feedback equalizer comprises the following: determining the feed forward tap weights $g_F$ and the feedback tap weights $g_B$ such that the feedback tap weights $g_B$ are constrained according to a constraint function, wherein the constraint function is based on a 2-norm of the feedback tap weights $g_B$ and an explicit constraint constant; and, supplying the feed forward tap weights $g_F$ and the feedback tap weights $g_B$ to the decision feedback equalizer.

BRIEF DESCRIPTION OF THE DRAWINGS

These and other features and advantages will become more apparent from a detailed consideration of the invention when taken in conjunction with the drawing in which.

DETAILED DESCRIPTION

Figure 1:
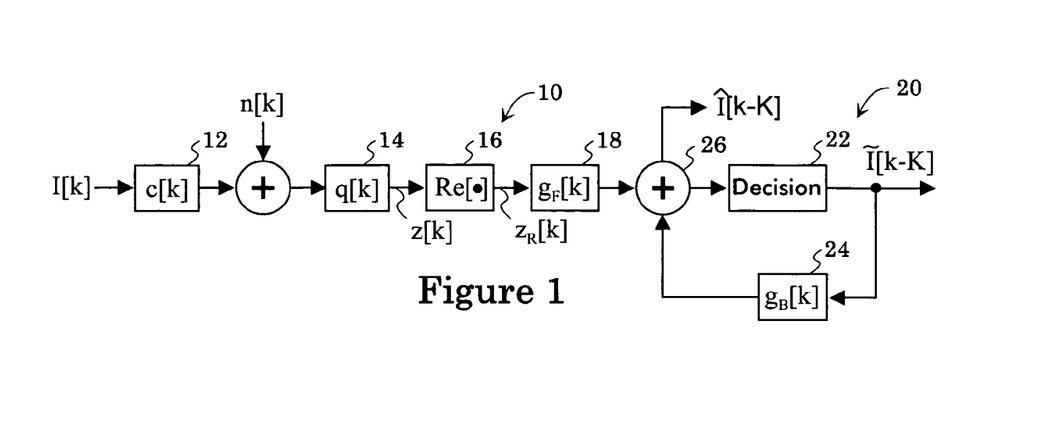
FIG. 1 shows a baseband equivalent discrete-time equalizer system useful in describing the present invention; and, FIG. 2 illustrates a decision feedback equalizer according to the present invention; and, FIG. 3 is a flow chart based on the equations and algorithms described below for determining tap weights of the decision feedback equalizer of FIG. 2.

A baseband equivalent discrete-time equalizer system 10 is shown in FIG. 1. The sequence I[k] represents the transmitted symbols which are assumed to be independent and equally probable with zero mean and with a variance $\xi_I = E\{|I[k]|^2\}$, where E is the expectation operator. For 8-VSB such as used in digital television according to the 1996 ATSC digital television (DTV) standard, the transmitted symbols are taken from the set $A = \{\pm 1, \pm 3, \pm 5, \pm 7\}$.

In continuous time, the symbols I[k] are transmitted through the multipath channel 12. The multipath channel 12 is denoted c[k] and contains M paths with delays $\tau_i$ and complex gains $\alpha_i$. Including the effect of pulse shaping at the transmitter, the channel impulse response of the channel 12 is given by the following equation:

$$c(t) = \sum_{i=1}^{M} \alpha_i q(t - \tau_i). \tag{1}$$

The path considered to be the "main" path is always assigned a delay $\tau$ of zero. In an ATSC 8-VSB system, the transmitted pulse q(t) has a square-root raised cosine spectrum with a nominal bandwidth of one-half the symbol rate, but is shifted up in frequency by one-fourth the symbol rate. Therefore, the transmitted pulse shape q(t) is complex.

The discrete-time channel c[k] is found by sampling c(t) at the symbol rate. A pulse shaping filter 14 at the receiver is denoted q[k] and is obtained by sampling q(t) at the symbol rate. Because $q^*(-t)=q(t)$, the pulse shaping filter 14 is matched to the transmitter filter (where * denotes complex conjugation). It is assumed that q[k] has finite length and is given in vector form by $q=[q[-L_q] \ldots q[0] \ldots q[L_q]]^T$. The composite channel is a combination of the channel and the pulse shaping and is defined as h[k]=c[k]*q[k] (where * indicates convolution). It is assumed that the composite channel also has a finite length and is given in vector form by $h=[h[-L_{ha}] \ldots h[L_{hc}]]^T$. The length of the composite channel is $L_h+1$, where $L_h=L_{ha}+L_{hc}$, where $L_{ha}$ is the number of taps prior to the main path, and where $L_{hc}$ is the number of taps after the main path. The noise sequence η[k] is introduced as shown in FIG. 1 and is complex additive white Gaussian noise (AWGN) with a power spectral density of $N_0$.

Theoretically, the pulse shape q(t) is doubly infinite in length in that it extends from −infinity to +infinity. However, the magnitude of the pulse falls as a function of $1/t^3$ from the y-axis at t=0. Therefore, the pulse can be well approximated by truncating in time. As a result, $L_q$ may be chosen as desired to define the truncation.

The received signal z[k] is given by the following equation:

$$z[k]=h[k]*I[k]+v[k], \tag{2}$$

where v[k]=η[k]*q[k] is colored complex noise. For ease of explanation, it is assumed that the equalizer is a real equalizer so that the real part of the signal is taken prior to a feedforward filter 18 of a decision feedback equalizer 20 at 16. A subscript R is used herein to indicate the real part of a given quantity. Therefore, the input signal to the decision feedback equalizer 20 may be written according to the following equation:

$$z_R[k]=Re\{z[k]\}=h_R[k]*I[k]+v_R[k], \tag{3}$$

where $h_R[k]=Re\{h[k]\}$ and $v_R[k]=Re\{v[k]\}$. Because the feed forward filter 18 of the decision feedback equalizer 20 contains ($N_{FF}$+1) taps, ($N_{FF}$+1) consecutive samples of $z_R[k]$ are assembled into a vector according to the following equation:

$$z_R[k]=H_R I[k]+v_R[k] \tag{4}$$

where $z_R[k]=[z_R[k] \ldots z_R[k-N_{FF}]]^T$ is the vector at the input of the decision feedback equalizer 20, $I[k]=[I[k+L_{ha}] \ldots I[k-L_{hc}-N_{FF}]]^T$ is a vector of transmitted symbols, and $V_R[k]=[v_R[k] \ldots v_R[k-N_{FF}]]^T$ is the real part of the colored complex noise. It is known that $V_R[k]$ is white. The channel matrix $H_R$ may be given by the following equation:

$$H_R = \begin{bmatrix} h_R[-L_{ha}] & h_R[-L_{ha}+1] & \cdots & h_R[L_{hc}] & 0 & \cdots & 0 \\ 0 & h_R[-L_{ha}] & \cdots & h_R[L_{hc}-1] & h_R[L_{hc}] & \cdots & 0 \\ \vdots & \vdots & \ddots & \vdots & \vdots & \ddots & \vdots \\ 0 & 0 & \vdots & h_R[-L_{ha}] & h_R[-L_{ha}+1] & \cdots & h_R[L_{hc}] \end{bmatrix} \tag{5}$$

The colored complex noise vector is given by the following equation:

$$V[k]=Q\eta[k] \tag{6}$$

where $\eta[k]=[\eta[k+L_q] \ldots \eta[k-L_q-N_{FF}]]^T$ and Q is given by the following equation:

$$Q = \begin{bmatrix} q[-L_q] & q[-L_q+1] & \cdots & q[L_q] & 0 & \cdots & 0 \\ 0 & q[-L_q] & \cdots & q[L_q-1] & q[L_q] & \cdots & 0 \\ \vdots & \vdots & \ddots & \vdots & \vdots & \ddots & \vdots \\ 0 & 0 & \vdots & q[-L_q] & q[-L_q+1] & \cdots & q[L_q] \end{bmatrix} \tag{7}$$

The remainder of the decision feedback equalizer 20 includes a decision device 22, a feedback filter 24, and a summer 26. The summer 26 adds the output of the feed forward filter 18 and the output of the feedback filter 24, and the decision device 22 processes the output of the summer 26 by determining correct values for the symbols at the output of the summer 26. The feed forward filter 18 applies feed forward taps to $z_R[k]$. The feedback filter 24 applies feedback taps to the symbol decisions from the decision device 22. The output of the summer 26 is the output of the decision feedback equalizer 20.

The feed forward filter 18 has ($N_{FF}$+1) taps and the feedback filter 24 has $N_{FB}$ taps. The coefficient vectors for the feed forward filter 18 and the feedback filter 24 are $g_F=[g_F[0] \ldots g_F[N_{FF}]]^T$ and $g_B=[g_B[1] \ldots g_B[N_{FB}]]^T$, respectively. At the output of the decision feedback equalizer 20, the symbol estimate is given by the following equation:

$$\hat{I}[k-K]=g_F^T z_R[k]+g_B^T \tilde{I}[k-K-1], \tag{8}$$

where $$\tilde{I}[k] = [\tilde{I}[k] \cdots \tilde{I}[k+1-N_{FB}]]^T$$

are the decisions from $N_{FB}$ previous symbols. It is noted that $\tilde{I}[k] \in A$. The integer K is defined to be the cursor, which identifies the symbol being estimated in I[k]. The decision device 22 may be a standard 8-level slicer (quantizer), a trellis decoder, or other decision device.

The following equations may be assumed:

$$R_{z_R z_R} = H_R H_R^T + \frac{N_0}{\xi_I} I_{N_{FF}+1} \qquad (10)$$

$$R_{z_R I_B} = H_R \Delta_K \qquad (11)$$

$$r_{I_{z_R}} = H_R \delta_{K+L_{ha}} \qquad (12)$$

where $\xi_I$ is the symbol variance, and where $$\frac{N_0}{\xi_I}$$

is the inverse of the signal-to-noise ratio. The vector $\delta_n$ contains all zeros except for a one in component n+1. When $N_{FB} \leq L_{hc} + N_{FF} - K$, then $$\Delta_K = \begin{bmatrix} 0_{(L_{ha}+K+1) \times N_{FB}} \\ I_{N_{FB}} \\ 0_{(N_{FF}+L_{hc}-K-N_{FB}) \times N_{FB}} \end{bmatrix}. \qquad (13)$$

In this system of equations, $0_{m \times n}$ is a zero matrix with m rows and n columns, and $I_n$ is the n×n identity matrix. It is possible for $N_{FB}$ to be greater than $L_{hc} + N_{FF} - K$. In this case, there would be excess feedback taps which, ideally, are set to 0.

The mean square error (MSE) between the equalizer output symbols and the transmitted symbols is given by the following equation:

$$MSE(g_F, g_B) = E\left[(I[k-K] - \hat{I}[k-K])^2\right] \qquad (14)$$

$$= \xi_I (1 - 2g_F^T r_{I_{z_R}} + 2g_F^T R_{z_R I_B} g_B + g_F^T R_{z_R z_R} g_F + g_B^T g_B)$$

where E is the expectation operator. The minimum mean square error decision feedback equalizer tap weights $(g_F, g_B)$ are calculated by differentiating equation (14) with respect to $g_F$ and $g_B$, setting the respective derivatives equal to zero, and then simultaneously solving the two equations for $g_F$ and $g_B$. This method is well known.

In considering error propagation, the error at the output of the decision feedback equalizer 20 is given by $e[k] = \tilde{I}[k] - I[k]$. Substituting equations (4) and (8) into $e[k]$ yields the following equation:

$$e[k] = g_F^T H_R I[k+K] + g_F^T v_R[k+K] + g_B^T \tilde{I}[k-1] - I[k] \qquad (15)$$

The channel matrix $H_R$ can be partitioned in accordance with the following equation:

$$H_R = [H_{RF} \ h_R^{(rt)} \ H_{RP1} \ H_{RP2}] \qquad (16)$$

where $H_{RF}$ has $K+L_{ha}$ columns, $h_R^{(rt)}$ is a single column (and is a time-reversed and possibly truncated and/or zero padded channel vector), $H_{RP1}$ has $N_{FB}$ columns, and $H_{RP2}$ has $L_{hc} + N_{FF} - K - N_{FB}$ columns. Also, $I[k+K]$ can be similarly partitioned according to the following equation:

$$I[k+K] = [I_F[k]^T \ I[k] \ I_{P1}[k]^T \ I_{P2}[k]^T]^T \qquad (17)$$

where similarly $I_F^T$ has $K+L_{ha}$ columns, $I[k]$ is a scalar, $I_{P1}^T$ has $N_{FB}$ columns, and $I_{P2}^T$ has $L_{hc}+N_{FF}-K-N_{FB}$ columns. According to equations (15)-(17), the equalizer error may be given by the following equation:

$$e[k] = g_F^T H_{RF} I_F[k] + (g_F^T h_R^{(rt)} - 1) I[k] + g_F^T H_{RP1} I_{P1}[k] + g_F^T H_{RP2} I_{P2}[k] + g_F^T v_R[k+K] + g_B^T \tilde{I}[k-1]. \qquad (18)$$

Because $R_{z_R I_B} = H_{RP1}$ and $r_{I_{z_R}} = h_R^{(rt)}$, the following equation is obtained:

$$g_B = -H_{RP1}^T g_F \qquad (19)$$

(the feedback filter taps $g_B$ results from a convolution of the channel and the feed forward filter taps $g_F$) and the equalizer error is now given by the following equation:

$$e[k] = g_B^T (\tilde{I}[k-1] - I_{P1}[k]) + (g_F^T h_R^{(rt)} - 1) I[k] + g_F^T H_{RF} I_F[k] + g_F^T H_{RP2} I_{P2}[k] + g_F^T v_R[k+K] \qquad (20)$$

The first term of equation (20) is due to decision errors, the second term of equation (20) is due to equalizer bias, the third and fourth terms of equation (20) are residual intersymbol interference (ISI), and the last term of equation (20) originates from the noise.

Equation (20) demonstrates how error propagation occurs in the unconstrained equalizer. If a single nearest-neighbor decision error (magnitude 2) exists in $\tilde{I}[k-1]$, and when that error reaches the position of the maximum magnitude feedback tap $g_{B_{max}}$, the contribution to the error $e[k]$ is $2g_{B_{max}}$. If $g_{B_{max}} > \frac{1}{2}$, and if $I[k]$ is not ±7, the decision error contribution to the symbol estimate pushes the symbol estimate across the decision threshold, and an additional error is likely. When $I[k]$ is ±7, the decision error must have the right polarity to push the symbol estimate across the decision boundary. When each additional error reaches the same feedback tap, a new error is again likely, and a potentially long sequence of errors may occur.

The following analysis examines conditions under which no error propagation occurs. The following simplifying assumptions can be made: the equalizer is unbiased $(g_F^T h_R^{(rt)} = 1)$; there is negligible residual ISI so that $g_F^T H_{RF} I_F[k]$ and $g_F^T H_{RP2} I_{P2}[k]$ are negligible); and, there is negligible noise contribution so that $g_F^T v_R[k+K]$ is negligible.

In other words, the focus of the analysis is placed only on the decision errors in equation (20). With the above assumptions, equation (20) can be re-written as the following equation:

$$e[k] = g_B^T (\tilde{I}[k-1] - I_{P1}[k]) \qquad (21)$$

$$= \sum_{m=1}^{N_{FB}} g_B[m] (\tilde{I}[k-m] - I[k-m])$$

When using a standard slicer as the decision device 22, the probability of error is zero when $|e[k]| < 1$. This condition can be assured if the following inequality is true:

$$\sum_{m=1}^{N_{FB}} |g_B[m]| |\tilde{I}[k-m] - I[k-m]| < 1 \qquad (22)$$

If it is also assumed that the probability of making a decision error which is not a nearest neighbor of the correct symbol is negligible, then all decision errors have magnitude 2. That is, $|\tilde{I}[k]-I[k]| \leq 2$ for all k. Therefore, if $$\|g_B\|_1 = \sum_{m=1}^{N_{FB}} |g_B[m]| < \frac{1}{2} \qquad (23)$$

then the probability of a decision error propagating a new error (under these assumptions) is zero. $\|g_B\|_1$ is the 1-norm.

The analysis above indicates how error propagation may be eliminated if the feedback tap vector $g_B$ satisfies a constraint on its 1-norm. It is also possible to place a constraint on other norms of $g_B$ such as $\|g_B\|_2^2 \leq M_2^2$ where $\|g_B\|_2^2$ is the squared 2-norm of the feedback tap vector $g_B$. The discussion below describes how to calculate new equalizer coefficients by directly constraining the squared 2-norm of the feedback tap vector. The equalizer coefficients are calculated by solving the following minimization problem:

minimize $\text{MSE}(g_F, g_B)$ (24a)

subject to $\|g_B\|_2^2 \leq M_2^2$ (24b)

where $M_2$ is the 2-norm constraint and $\|g_b\|_2^2$ is the squared 2-norm of the feedback tap weights $g_B$. The minimization is performed over both $g_F$ and $g_B$.

When calculating tap weights that minimize the mean squared error MSE subject to an inequality constraint as given in (24b), the Lagrangian function given by the following equation can be used:

$$L(g_F, g_B, \lambda) = \text{MSE}(g_F, g_B) + \lambda(\|g_B\|_2^2 - M_2^2), \lambda \geq 0 \qquad (25)$$

$$= \text{MSE}(g_F, g_B) + \lambda \left( \sum_{m=1}^{N_{FB}} |g_B[m]|^2 - M_2^2 \right), \lambda \geq 0$$

where $L(g_F, g_B, \lambda)$ comprises a Lagrangian function having $g_F, g_B$, and $\lambda$ as variables. Then, this expression is differentiated with respect to $g_F$, $g_B$, and $\lambda$, the three derivatives are each set equal to zero, and the three equations can be solved simultaneously for $g_F$, $g_B$, and $\lambda$.

The second term on the right hand side of equation (25) is the constraint function.

The multiplier $\lambda$ may be calculated using the algorithms described below. During calculation of the multiplier $\lambda$, $g_F$ and $g_B$ are also calculated and may be supplied to the feed forward filter and the feedback filter of the decision feedback equalizer.

With the assumption of correct decisions by the decision device 22, the Karush-Kuhn-Tucker (KKT) theorem yields the following equations:

$$\lambda(g_B^T g_B - M_2^2) = 0 \qquad (26)$$

-continued $$g_B = -\frac{\xi_I}{\xi_I + \lambda} R_{z_R I_B}^T g_F \qquad (27)$$

$$\left( R_{z_R z_R} - \frac{\xi_I}{\xi_I + \lambda} R_{z_R I_B} R_{z_R I_B}^T \right) g_F = r_{I z_R} \qquad (28)$$

where $\lambda \geq 0$ and is the KKT multiplier.

If $\lambda$ were known, equations (26)-(28) would form a set of simultaneous linear equations in the unknown vectors $g_F$ and $g_B$. These simultaneous linear equations can then be solved for $g_F$ and $g_B$. However, because $\lambda$ is not known, equations (26)-(28) are non-linear in the unknown vectors $g_F$, $g_B$, and $\lambda$, and an iterative solution may be used to solve for $\lambda$. It is noted that, if $\lambda=0$, the equalizer is unconstrained.

Iterative algorithms for calculating the constrained equalizer are based on a recursive equation for calculating the Karush-Kuhn-Tucker multiplier. The derivation of this equation begins with the choice of a valid initial value for the multiplier denoted by $\lambda_0$. Given $\lambda_0$, equations (27) and (28) become linear and are easily solved for $g_{F0}$ and $g_{B0}$. If equation (26) is adequately satisfied, then the iteration terminates. If equation (26) is not adequately satisfied, then $\lambda$ is assumed to be positive and equations (26) and (27) are used with $g_{F0}$ and $g_{B0}$ to calculate a new value for the multiplier $\lambda$.

Therefore, the new value for $\lambda$ is given by the following equation:

$$\lambda_1 = \frac{\xi_I}{M_2} \|R_{z_R I_B}^T g_{F0}\|_2 - \xi_I. \qquad (29)$$

If the calculated value of $\lambda_1$ is negative, the multiplier $\lambda_1$ is set to zero. The value of $\lambda_1$ is then used to calculate $g_{F1}$ and $g_{B1}$ using equations (27) and (28). In general, the multiplier $\lambda_{k+1}$ can be calculated according to the following equation:

$$\lambda_{k+1} = f(\lambda_k) \triangleq \frac{\xi_I}{M_2} \|R_{z_R I_B}^T g_{Fk}\|_2 - \xi_I. \qquad (30)$$

where the dependence upon $\lambda_k$ arises only from $g_{Fk}$.

Equation (30) defines a fixed point iteration for $\lambda$. It is well known that a fixed point iteration converges only when the magnitude of the first derivative of $f(\lambda)$ is less than 1. This condition cannot be guaranteed, so an alternative approach is required.

One alternative approach to the iterative solution of equations (26), (27), and (28) is to simply search for a fixed point of $f(\lambda)$. This search is equivalent to finding the root $\lambda$ of the following non-linear equation:

$$F(\lambda) = f(\lambda) - \lambda = 0 \qquad (31)$$

where $F(\lambda)$ is a function having $\lambda$ as a variable and is based on a difference between $f(\lambda)$ and $\lambda$. A number of algorithms, such as the secant algorithm and various forms of regula falsi, may be used to find a root of a nonlinear equation. Algorithms for the specific application of calculating constrained equalizer coefficients are discussed below.

A general outline of the algorithm used to calculate the constrained equalizer coefficients is given as Algorithm 1.

Algorithm 1
    Given $\lambda_0 = 0$
    k=0
    Find $g_{F0}$, $g_{B0}$
    Calculate $f(\lambda_0)$ and $F(\lambda_0)$
    Evaluate termination criterion
    while $k < k_{max}$ and termination criterion is not met do
        Calculate $\lambda_{k+1}$
        k=k+1
        Find $g_{Fk}$, $g_{Bk}$
        Calculate $f(\lambda_k)$, $F(\lambda_k)$
        Evaluate termination criterion
    end while where $f(\lambda_k)$ is a function having $\lambda_k$ as a variable. $\lambda_0$ in the first line of Algorithm 1 may have values other than 0 as long as $\lambda_0$ is not a negative value. The tap weights $g_{F0}$, $g_{B0}$, $g_{Fk}$, and $g_{Bk}$ can be calculated from equations (27) and (28), and $\lambda_{k+1}$ can be calculated as discussed below. Equation (30) is used to calculate $f(\lambda_0)$ and $f(\lambda_k)$, and equation (31) is used to calculate $F(\lambda_0)$ and $F(\lambda_k)$.

Because the goal of the calculation of the tap weights $g_{Fk}$ and $g_{Bk}$ is for the 2-norm of the feedback taps to satisfy a constraint, a suitable termination criterion to use in the evaluate termination criterion lines in Algorithm 1 is when $\|g_B\|_2$ sufficiently satisfies the constraint. When $\lambda=0$, then $\|g_B\|_2 \leq (1+\delta)M_2$, where $\delta$ is an allowed tolerance. When $\lambda > 0$, algorithm 1 terminates when $(1-\delta)M_2 \leq \|g_B\|_2 \leq (1+\delta)M_2$. Using equations (27) and (30), the termination criterion becomes $F(\lambda)/\xi_I \leq \delta$ when $\lambda = 0$ and $|F(\lambda)|/(\xi_I + \lambda) \leq \delta$ when $\lambda > 0$, as shown in Algorithm 2.

Algorithm 2 if $\lambda_k = 0$, then
    if $\dfrac{F(\lambda_k)}{\xi_I} \leq \delta$ then
        Termination criterion is met.
    end if
else if $\lambda_k > 0$ then
    if $\dfrac{|F(\lambda_k)|}{\xi_I + \lambda_k} \leq \delta$ then
        Termination criterion is met.
    end if
end if The key step in Algorithm 1 is the calculation of $\lambda_{k+1}$ in the seventh line. The following three alternative methods of performing the calculation $\lambda_{k+1}$ are presented below: (i) a modified regula falsi algorithm known as the "Pegasus" algorithm (algorithm 3 below) which converges at a rate slightly faster than the secant algorithm; (ii) the secant algorithm, modified to ensure convergence (algorithms 4 and 5 below); and, (iii) a nonlinear fit to the function $f(\lambda)$ using a function which has the same general shape as $f(\lambda)$ (algorithm 6 below)

However, other algorithms can be used to calculate $\lambda_{k+1}$. For example, a standard regula falsi algorithm can be used, although the standard regula falsi algorithm will not converge as quickly as the Pegasus algorithm. Another algorithm that can be used is described in "A modified regula falsi method for computing the root of an Equation," Dowell, M. and Jarratt, P, BIT, vol. 11, no. 2, pp. 168-174, 1971 and is likely to converge nearly as quickly as Pegasus.

First, the Pegasus iteration is shown in Algorithm 3.

Algorithm 3 if k = 0 then
    $\lambda_1 = \max(0, f(\lambda_0))$
else if k = 1 then
    $\lambda_{old} = \lambda_0$
    $\lambda_{new} = \lambda_1$
    $F_{old} = F(\lambda_0)$
    $F_{new} = F(\lambda_1)$ $\lambda_2 = \lambda_{new} - F_{new} \dfrac{(\lambda_{new} - \lambda_{old})}{(F_{new} - F_{old})}$ else
    if $F(\lambda_k) F_{new} < 0$ then
        $\lambda_{old} = \lambda_{new}$
        $\lambda_{new} = \lambda_k$
        $F_{old} = F_{new}$
        $F_{new} = F(\lambda_k)$
    else
        $\lambda_{new} = \lambda_k$ $F_{old} = \dfrac{F_{old} F_{new}}{F_{new} + F(\lambda_k)}$ $F_{new} = F(\lambda_k)$
    end if $\lambda_{k+1} = \lambda_{new} - F_{new} \dfrac{(\lambda_{new} - \lambda_{old})}{(F_{new} - F_{old})}$ end if Like the standard regula falsi algorithm, the Pegasus algorithm begins with an interval known to contain a root of the equation for $\lambda_{k+1}$. This interval is established in the second line of Algorithm 3 by $\lambda_0$ and $\lambda_1$. Because $f'(\lambda)$ is always negative, $F'(\lambda) < -1$. Therefore, $F(\lambda)$ is guaranteed to have a root in the interval $(\lambda, \lambda + F(\lambda))$ or, equivalently, $(\lambda, f(\lambda))$. The new value of $\lambda$ is the maximum of zero and $f(\lambda)$ to ensure that $\lambda \geq 0$ and that the unconstrained equalizer is checked when necessary. Once the interval has been established, algorithm 3 replaces $(\lambda_{old}, F_{old})$ with $(\lambda_{new}, F_{new})$ if $F(\lambda_k)$ and $F_{new}$ have opposite signs. If $F(\lambda_k)$ and $F_{new}$ have the same sign, $\lambda_{old}$ is retained, but $F_{old}$ is scaled down in the seventeenth line of algorithm 3. This scaling significantly improves the convergence rate over the standard regula falsi algorithm. In both cases, $(\lambda_{new}, F_{new})$ is replaced by $(\lambda_k, F(\lambda_k))$ and then $\lambda_{k+1}$ is calculated where the secant from $(\lambda_{old}, F_{old})$ to $(\lambda_{new}, F_{new})$ intersects the $\lambda$-axis (the twentieth line of Algorithm 3).

The second algorithm for calculating $\lambda_{k+1}$ of Algorithm 1 is a modified secant iteration and is shown in Algorithm 4.

Algorithm 4 if k = 0 then
    $\lambda_1 = \max(0, \lambda_0 + F(\lambda_0)/Z)$
    if $F(\lambda_0) > 0$ then
        $B_1 = \lambda_0$
        $B_u = f(\lambda_0)$
        Lower bound $B_1$ has been checked
        Upper bound $B_u$ has not been checked
    else
        $B_1 = \max(0, f(\lambda_0))$ -continued
```
        Lower bound B_l has not been checked
        Upper bound B_u has been checked
    end if
else
```

$$\lambda_{k+1} = \lambda_k - F(\lambda_k) \frac{(\lambda_k - \lambda_{k-1})}{(F(\lambda_k) - F(\lambda_{k-1}))}$$

```
    if λ_{k+1} > B_u then
        if upper bound B_u has not been checked then
            λ_{k+1} = B_u
            Upper bound B_u has been checked
        else
            λ_{k+1} = (max (λ_k, λ_{k-1}) + B_u )/2
        end if
    else if λ_{k+1} ≤ B_l then
        if lower bound B_l has not been checked then
            λ_{k+1} = B_l
            Lower bound B_l has been checked
        else
            λ_{k+1} = (min (λ_k, λ_{k-1}) + B_l)/2
        end if
    end if
end if
```

Although the standard secant algorithm does not necessarily bracket the desired root, secant algorithm 4 does bracket the desired root. If the sign of the second derivative of the function F is not constant, the standard secant algorithm is not guaranteed to converge. Because the locations of the inflection points of f($\lambda$) (and, therefore, F($\lambda$)) are not known, the standard secant algorithm may not converge. Therefore, because knowledge of F($\lambda$) directly provides an interval for the root, the algorithm is modified to stay within the interval. In the second line of algorithm 4, $\lambda_1$ is taken as $\lambda_0 + F(\lambda_0)/Z$ (or zero if this value is negative), which lies between $\lambda_0$ and $\lambda_0 + F(\lambda_0)$, where $Z \geq 1$. Normally, Z is chosen to be 2. The interval containing the root is tracked by $B_l$ and $B_u$, and $\lambda_{k+1}$ is set to one of the endpoints only when the secant formula in the fifteenth line of algorithm 4 places it outside the interval. If the endpoint has already been checked, $\lambda_{k+1}$ is placed halfway between the endpoint and the closest previous point as indicated by the twenty-first and twenty-eighth lines of algorithm 4.

In addition to the basic iteration, secant algorithm 4 must update the interval after calculating $F(\lambda_k)$ in the tenth line of algorithm 1. This update is shown as Algorithm 5. If Algorithm 4 is used to calculate $\lambda_{k+1}$, then an additional line should be added to algorithm 1 between the tenth and eleventh lines that calls algorithm 5.

Algorithm 5

```
if B_l < λ_k < B_u then
    if F(λ_k) > 0 then
        B_l = λ_k
        Lower bound B_l has been checked
        if f(λ_k) < B_u then
            B_u = f(λ_k)
            Upper bound B_u has not been checked
        end if
    else if F(λ_k) < 0 then
        B_u = λ_k
        Upper bound B_u has been checked
        if f(λ_k) > B_l then
            B_l = f(λ_k)
            Lower bound B_l has not been checked
        end if
    end if
end if
```

If $\lambda_k$ is (strictly) inside the interval, the bound corresponding to the sign of $F(\lambda_k)$ is updated. In addition, $f(\lambda_k)$ may indicate that the other bound should also be updated, as indicated by the fifth and twelfth lines of algorithm 5.

Finally, consider fitting $f(\lambda)$ to a function and determining the next value of $\lambda$ from this fit. When the dependence on $\lambda$ is closely examined in the following equation:

$$f'(\lambda) = -\frac{\xi_I}{M_2(\xi_I + \lambda)\|g_B\|_2} g_B^T R_{z_R I_B}^T \left( R_{z_R z_R} - \frac{\xi_I}{\xi_I + \lambda} R_{z_R I_B} R_{z_R I_B}^T \right)^{-1} R_{z_R I_B} g_B \tag{32}$$

where $g_B$ is a function of $\lambda$, $$R_{z_R z_R} = H_R H_R^T + \frac{N_0}{\xi_I} I_{N_{FF}+1},$$

and $R_{z_R I_B} = H_R \Delta_K$, $f(\lambda)$ is found to be roughly proportional to $1/(\xi_I + \lambda)^2$. Therefore, it should be possible to fit $f(\lambda)$ to a function given by the following equation:

$$\hat{f}(\lambda) = \frac{A}{\lambda + B} + C \tag{33}$$

or, equivalently, to fit $F(\lambda)$ to a function given by the following equation:

$$\hat{F}(\lambda) = \frac{A}{\lambda + B} + C - \lambda \tag{34}$$

The points $(\lambda_a, f(\lambda_a))$, $(\lambda_b, f(\lambda_b))$, $(\lambda_c, f(\lambda_c))$ are used to find the values of the three fitting parameters A, B, and C. Then $\lambda_{k+1}$ is found by solving $\hat{F}(\lambda_{k+1}) = 0$. Solving the resulting equations, the fitting parameters are found to be given by the following equations:

$$D = \lambda_a(\Lambda_c - \Lambda_b) + \lambda_b(\Lambda_a - \Lambda_c) + \lambda_c(\Lambda_b - \Lambda_a)$$

$$C = [\lambda_a \Lambda_a(\Lambda_c - \Lambda_b) + \lambda_b \Lambda_b(\Lambda_a - \Lambda_c) + \lambda_c \Lambda_c(\Lambda_b - \Lambda_a)]/D$$

$$B = [\lambda_a \Lambda_a(\lambda_c - \lambda_b) + \lambda_b \Lambda_b(\lambda_a - \lambda_c) + \lambda_c \Lambda_c(\lambda_b - \lambda_a)]/D$$

$$A = (\lambda_c + B)(\Lambda_c - C)$$

where $\Lambda_x = f(\lambda_x)$ for x = a, b, c. The above equations can be numbered (35), (36), (37), and (38) in order. The new value of $\lambda$ is then found by setting $\hat{F}(\lambda_{k+1}) = 0$ which yields the following equation:

$$\lambda_{k+1} = \frac{(C - B) + \sqrt{(B + C)^2 + 4A}}{2} \tag{38}$$

The steps involved in this nonlinear fit iteration are shown as algorithm 6.

Algorithm 6

```
if k = 0 then
    λ₁ = max(0, λ₀ + F(λ₀)/Z
else if k = 1 then
```

$$\lambda_2 = \lambda_1 - F(\lambda_1) \frac{(\lambda_1 - \lambda_0)}{(F(\lambda_1) - F(\lambda_0))}$$

```
    λ₂ = max(0, λ₂)
else
    if k = 2 then

λ = [λ₀, λ₁, λ₂]

F_λ = [F(λ₀), F(λ₁), F(λ₂) ]
    else
        State = sign(F_λ)
        if State = [+1, −1, −1] or State = [−1, +1, +1]

λ = [λ(1), λ(3), (λ_k)]

F_λ = [F_λ(1), F_λ(3), F(λ_k)]
        else
            λ = [λ(2), λ(3), (λ_k)]

F_λ = [F_λ(2), F_λ(3), F(λ_k)]
        end if
    end if
    λ_a = λ(1)
    λ_b = λ(2)
    λ_c = λ(3)
    Λ_a = f(λ_a)
    Λ_b = f(λ_b)
    Λ_c = f(λ_c)
    Calculated the fit constants D, C, B, and A
```

$$\lambda_{k+1} = \frac{(C - B) + \sqrt{(B + C)^2 + 4A}}{2}$$

```
    λ_{k+1} = max(0, λ_{k+1})
end if
```

$\lambda(j)$ is the j'th component of the vector $\lambda$, and $F_\lambda(j)$ is the j'th component of the vector $F_\lambda$. In the second line of algorithm 6, $\lambda_1$ is found as in the secant iteration, again with $Z \leq 1$. The next value of $\lambda$ is found in the fourth and fifth lines of algorithm 6 using the standard secant algorithm (also ensuring that $\lambda_{-2} \leq 0$). Subsequent values of $\lambda$ are found via the fit function. The eleventh through eighteenth lines of algorithm 6 ensure that, when possible, the root remains within the interval given implicitly in the vector $\lambda$. Equations (35), (36), (37), and (38) are used to calculate D, C, B, and A in the twenty-sixth line.

When the termination criterion of Algorithm 2 is met, the final calculated values for $g_F$ and $g_B$ in the ninth line of Algorithm 1 are then supplied to the feed forward filter and the feedback filter, respectively, of the decision feedback equalizer.

Figure 2:
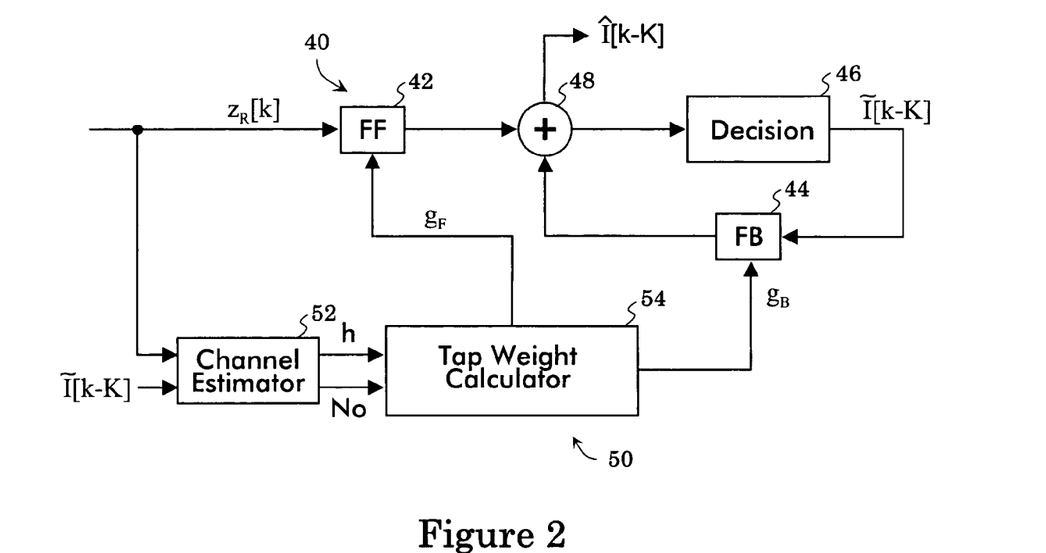

A decision feedback equalizer 40 that implements the present invention is shown in FIG. 2. The decision feedback equalizer 40 includes a feed forward filter 42 that includes a plurality of feed forward taps $g_F$, a feedback filter 44 that includes a plurality of feedback taps $g_B$, a decision device 46 such as a slicer or trellis decoder, a summer 48, and a tap weight calculator 50 that sets the tap weights $g_F$ and $g_B$ for the feed forward filter 42 and the feedback filter 44.

The feed forward filter applies the feed forward taps $g_F$ to the received signal. The outputs of the feed forward filter 42 and the feedback filter 44 are summed by the summer 48. The output of the summer 48 forms the output of the decision feedback equalizer 40. The decision device 46 makes symbol decisions for the output of the summer 48 and feeds these symbol decisions to the feedback filter 44 which applies the feedback taps $g_B$ to these symbol decisions.

The tap weight calculator 50 includes a channel estimator 52 that estimates the channel impulse response h of the channel through which a signal is received. Methods for making this estimation are well known. A tap weight determiner 54 determines the feed forward tap weights $g_F$ and the feedback tap weights $g_B$ from the channel estimate and the channel noise based on the equations and algorithms discussed above.

Figure 3:
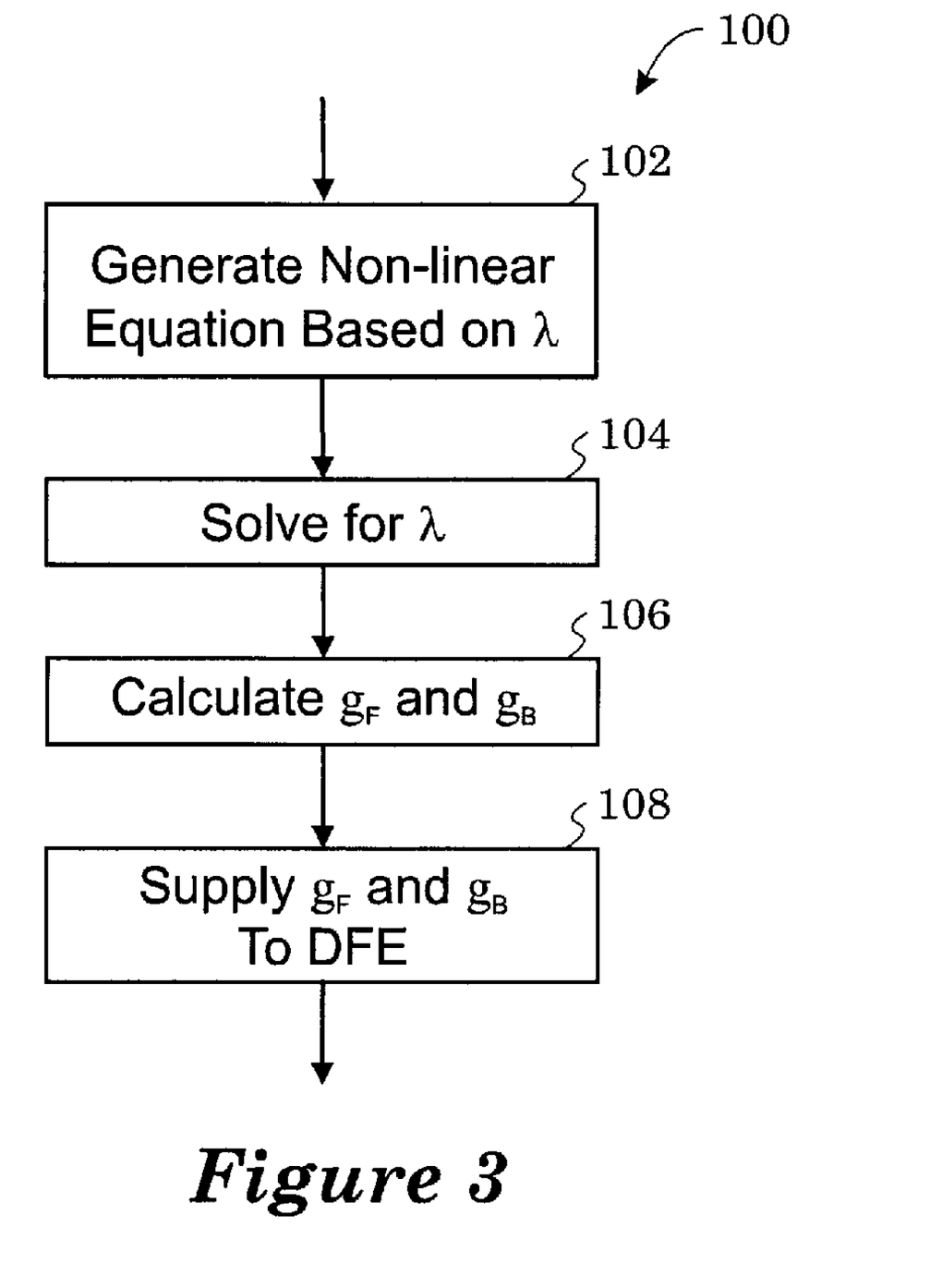

Thus, based on the equations and algorithms discussed above, the tap weight determiner 54 operates in accordance with the flow chart of FIG. 3. Accordingly, the tap weight determiner 54 implements a method 100 of supplying the tap weights $g_F$ to the taps of the forward filter 42 and the tap weights $g_B$ to the taps of the feedback filter 44 of the decision feedback equalizer 40. In this method, a non-linear equation with a constraint multiplier $\lambda$ as a root of the non-linear equation is generated at 102. The non-linear equation is solved at 104 for the constraint multiplier using an iterative process. The tap weights $g_F$ and $g_B$ are calculated at 106 as a function of the constraint multiplier $\lambda$ such that the tap weights $g_B$ are constrained by a constraint M. The tap weights $g_F$ and $g_B$ are supplied at 108 to the decision feedback equalizer.

As indicated above, the method 100 uses the equations and algorithms discussed above. For example, the method 100 determines the feed forward tap weights $g_F$ and the feedback tap weights $g_B$ such that the feedback tap weights $g_B$ are constrained according to a constraint function. As indicated by the equations above, the constraint function is based on a 2-norm of the feedback tap weights $g_B$ and an explicit constraint constant.

Methods for determining channel noise variance are well known. The tap weight determiner 54 supplies the feed forward tap weights $g_F$ to the feed forward filter 42 and the feedback tap weights $g_B$ to the feedback filter 44 for application to the received signal and the symbol decisions, respectively. As shown in FIG. 2, the constraint value $M_2$ is provided to the tap weight determiner 54.

Certain modifications of the present invention have been discussed above. Other modifications will occur to those practicing in the art of the present invention. For example, the present invention is applicable to other types of systems and to other modulation techniques such as 8 VSB and quadrature amplitude modulation (QAM).

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

I claim:

1. A method of supplying tap weights $g_F$ and $g_B$ to feed forward and feedback taps of a decision feedback equalizer comprising:

generating a non-linear equation with a constraint multiplier as a root of the non-linear equation;

solving the non-linear equation for the constraint multiplier using an iterative process;

calculating the tap weights $g_F$ and $g_B$ as a function of the constraint multiplier, wherein the tap weights $g_B$ are constrained by a constraint; and, supplying the tap weights $g_F$ and $g_B$ to the decision feedback equalizer.

2. The method of claim 1 wherein the tap weights $g_B$ and the constraint are related by a 2-norm constraint function.

3. The method of claim 2 wherein the 2-norm constraint function comprises a differentiable 2-norm constraint function.

4. The method of claim 3 wherein the 2-norm constraint function comprises $\|g_B\|_2^2 \leq M_2^2$, wherein $M_2$ comprises a 2-norm constraint, and wherein $\|g_B\|_2^2$ comprises the squared 2-norm of the tap weights $g_B$.

5. The method of claim 4 wherein the calculating of the tap weights $g_F$ and $g_B$ comprises differentiating the following equation with respect to $g_F$, $g_B$, and $\lambda$, setting the three derivatives to zero, and simultaneously solving the three equations for $g_F$, $g_B$, and $\lambda$:

$$L(g_F, g_B, \lambda) = MSE(g_F, g_B) + \lambda(\|g_B\|_2^2 - M_2^2), \lambda \geq 0$$

wherein $\lambda$ comprises the constraint multiplier, wherein $M_2$ comprises the constraint, and wherein $MSE(g_F, g_B)$ comprises the mean square error (MSE) between the output symbols at an output of the equalizer and transmitted symbols, and wherein $L(g_F, g_B, \lambda)$ comprises a Lagrangian function having $g_F$, $g_B$, and $\lambda$ as variables.

6. The method of claim 1 wherein the constraint multiplier comprises $\lambda$, wherein $$f(\lambda_k) \triangleq \frac{\xi_I}{M_2} \|R_{z_R I_B}^T g_{Fk}\|_2 - \xi_I,$$

wherein $M_2$ comprises the constraint and is a constant, wherein $R_{z_R I_B}$ comprises a cross correlation between transmitted symbols and received data of the decision feedback equalizer, wherein $\xi_I$ comprises a symbol variance, wherein k comprises an iteration index, and wherein $g_{Fk}$ is dependent upon $\lambda_k$ such that $f(\lambda_k)$ is a function having $\lambda_k$ as a variable.

7. The method of claim 6 wherein the non-linear equation comprises $F(\lambda) = f(\lambda) - \lambda = 0$, and wherein $F(\lambda)$ is a function having $\lambda$ as a variable and is based on a difference between $f(\lambda)$ and $\lambda$.

8. The method of claim 7 wherein the solving of the non-linear equation for the constraint multiplier comprises terminating the iterative process of solving the non-linear equation for the constraint multiplier when the constraint multiplier is within a predetermined tolerance.

9. The method of claim 7 wherein the solving of the non-linear equation for the constraint multiplier comprises:

terminating the iterative process of solving the non-linear equation for the constraint multiplier if $\lambda_k = 0$ and $$\frac{F(\lambda_k)}{\xi_I} \leq \delta;$$

and, terminating the iterative process of solving the non-linear equation for the constraint multiplier if $\lambda_k > 0$ and $$\frac{|F(\lambda_k)|}{\xi_I + \lambda_k} \leq \delta,$$

wherein $\delta$ comprises an allowable tolerance.

10. The method of claim 7 wherein the 2-norm constraint function comprises $\|g_B\|_2^2 \leq M_2^2$.

11. The method of claim 10 wherein the calculating of the tap weights $g_F$ and $g_B$ comprises differentiating the following equation with respect to $g_F$, $g_B$, and $\lambda$, setting the three derivatives to zero, and simultaneously solving the three equations for $g_F$, $g_B$, and $\lambda$:

$$L(g_F, g_B, \lambda) = MSE(g_F, g_B) + \lambda(\|g_B\|_2^2 - M_2^2), \lambda \geq 0$$

wherein $\lambda$ comprises the constraint multiplier, wherein $M_2$ comprises the constraint, and wherein $MSE(g_F, g_B)$ comprises the mean square error (MSE) between the output symbols at an output of the equalizer and transmitted symbols, and wherein $L(g_F, g_B, \lambda)$ comprises a Lagrangian function having $g_F$, $g_B$, and $\lambda$ as variables.

12. A method of supplying feed forward tap weights $g_F$ and feedback tap weights $g_B$ to respective feed forward and feedback taps of a decision feedback equalizer comprising:

determining the feed forward tap weights $g_F$ and the feedback tap weights $g_B$ such that the feedback tap weights $g_B$ are constrained according to a constraint function, wherein the constraint function is based on a 2-norm of the feedback tap weights $g_B$, a variable constraint multiplier, and an explicit constraint constant; and, supplying the feed forward tap weights $g_F$ and the feedback tap weights $g_B$ to the decision feedback equalizer.

13. The method of claim 12 wherein the 2-norm constraint function comprises a differentiable 2-norm constraint function.

14. The method of claim 13 wherein the 2-norm constraint function comprises $\|g_B\|_2^2 \leq M_2^2$, wherein $M_2$ comprises a 2-norm constraint, and wherein $\|g_B\|_2^2$ comprises the squared 2-norm of the tap weights $g_B$.

15. The method of claim 14 wherein the determining of the feed forward tap weights $g_F$ and the feedback tap weights $g_B$ comprises differentiating the following equation with respect to $g_F$, $g_B$, and $\lambda$, setting the three derivatives to zero, and simultaneously solving the three equations for $g_F$, $g_B$, and $\lambda$:

$$L(g_F, g_B, \lambda) = MSE(g_F, g_B) + \lambda(\|g_B\|_2^2 - M_2^2), \lambda \geq 0$$

wherein $\lambda$ comprises the variable constraint multiplier, wherein $M_2$ comprises the constraint, and wherein $MSE(g_F, g_B)$ comprises the mean square error (MSE) between the output symbols at an output of the equalizer and transmitted symbols, and wherein $L(g_F, g_B, \lambda)$ comprises a Lagrangian function having $g_F$, $g_B$, and $\lambda$ as variables.

16. The method of claim 12 wherein the determining of the feed forward tap weights $g_F$ and the feedback tap weights $g_B$ comprises:

generating a non-linear equation with the variable constraint multiplier as a root of the non-linear equation;

solving the non-linear equation for the variable constraint multiplier using an iterative process; and, calculating the feed forward tap weights $g_F$ and the feedback tap weights $g_B$ as a function of the variable constraint multiplier, wherein the feedback tap weights $g_B$ are constrained by a constraint.

17. The method of claim 16 wherein the variable constraint multiplier comprises $\lambda$, wherein $$f(\lambda_k) \triangleq \frac{\xi_I}{M_2} \|R^T_{z_R I_B} g_{Fk}\|_2 - \xi_I,$$

wherein $M_2$ comprises the constraint and is a constant, wherein $R_{z_R I_B}$ comprises a cross correlation between transmitted symbols and received data of the decision feedback equalizer, wherein $\xi_I$ comprises a symbol variance, wherein k comprises an iteration index, and wherein $g_{Fk}$ is dependent upon $\lambda_k$ such that $f(\lambda_k)$ is a function having $\lambda_k$ as a variable.

18. The method of claim 17 wherein the non-linear equation comprises $F(\lambda)=f(\lambda)-\lambda=0$, and wherein $F(\lambda)$ is a function having $\lambda$ as a variable and is based on a difference between $f(\lambda)$ and $\lambda$.

19. The method of claim 18 wherein the solving of the non-linear equation for the variable constraint multiplier comprises:

terminating the iterative process of solving the non-linear equation for the variable constraint multiplier if $\lambda_k=0$ and $$\frac{F(\lambda_k)}{\xi_I} \leq \delta;$$

and, terminating the iterative process of solving the non-linear equation for the variable constraint multiplier if $\lambda_k>0$ and $$\frac{|F(\lambda_k)|}{\xi_I + \lambda_k} \leq \delta,$$

wherein $\delta$ comprises an allowable tolerance.

20. The method of claim 18 wherein the solving of the non-linear equation for the variable constraint multiplier comprises terminating the iterative process of solving the non-linear equation for the variable constraint multiplier when the variable constraint multiplier is within a predetermined tolerance.

21. The method of claim 18 wherein the 2-norm constraint function comprises $\|g_B\|_2^2 \leq M_2^2$.

22. The method of claim 18 wherein the calculating of the tap weights $g_F$ and $g_B$ comprises differentiating the following equation with respect to $g_F$, $g_B$, and $\lambda$, setting the three derivatives to zero, and simultaneously solving the three equations for $g_F$, $g_B$, and $\lambda$:

$$L(g_F, g_B, \lambda) = MSE(g_F, g_B) + \lambda(\|g_B\|_2^2 - M_2^2), \lambda \geq 0$$

wherein $\lambda$ comprises the variable constraint multiplier, wherein $M_2$ comprises the constraint, and wherein $MSE(g_F, g_B)$ comprises the mean square error (MSE) between the output symbols at an output of the equalizer and transmitted symbols, and wherein $L(g_F, g_B, \lambda)$ comprises a Lagrangian function having $g_F$, $g_B$, and $\lambda$ as variables.

* * * * *